(12) United States Patent
Desai et al.

(10) Patent No.: US 8,223,201 B2
(45) Date of Patent: Jul. 17, 2012

(54) VOICE AND VIDEO OVER INTERNET PROTOCOL ENABLED SECURITY SYSTEM

(75) Inventors: Vani Desai, Bangalore (IN); NarayanaMurthy Subramanya J, Bangalore (IN); Sushil Jangam, Bangalore (IN); Skandesha Saligrama, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 565 days.

(21) Appl. No.: 12/434,810

(22) Filed: May 4, 2009

(65) Prior Publication Data

US 2010/0277585 A1 Nov. 4, 2010

(51) Int. Cl.
*H04N 7/18* (2006.01)
(52) U.S. Cl. .......................................... 348/143; 379/37
(58) Field of Classification Search .................. 348/143; 379/37; 455/404.1
See application file for complete search history.

(56) References Cited

U.S. PATENT DOCUMENTS

| | | | |
|---|---|---|---|
| 4,918,717 A * | 4/1990 | Bissonnette et al. ............ | 379/40 |
| 6,741,171 B2 | 5/2004 | Palka et al. | |
| 7,015,806 B2 | 3/2006 | Naidoo et al. | |
| 7,076,085 B1 | 7/2006 | Sah | |
| 7,277,018 B2 | 10/2007 | Reyes et al. | |
| 2003/0062997 A1 | 4/2003 | Naidoo et al. | |
| 2003/0115368 A1* | 6/2003 | Wu ............................... | 709/251 |
| 2003/0227540 A1 | 12/2003 | Monroe et al. | |
| 2004/0086093 A1* | 5/2004 | Schranz ......................... | 379/37 |
| 2006/0067484 A1* | 3/2006 | Elliot et al. ..................... | 379/37 |
| 2006/0239250 A1 | 10/2006 | Elliot et al. | |
| 2008/0048861 A1 | 2/2008 | Naidoo et al. | |
| 2008/0303903 A1 | 12/2008 | Bentley et al. | |
| 2012/0019657 A1* | 1/2012 | Lee .............................. | 348/143 |

OTHER PUBLICATIONS

European Search Report corresponding to European Application No. EP 10 16 0961, dated Aug. 23, 2010.
Oct. 12, 2011 European Office Action corresponding to Application No. 10 160 961.8-2413.

* cited by examiner

*Primary Examiner* — Joshua Joo
*Assistant Examiner* — Bryan Lee
(74) *Attorney, Agent, or Firm* — Husch Blackwell

(57) ABSTRACT

A method and apparatus are provided for operating a security system. The method includes the steps of providing a security panel coupled to a plurality of security sensors, a central monitoring station monitoring the security panel, coupling the security panel to the central panel through an Ethernet connection and periodically generating a heartbeat within the security panel that is periodically sent to the central station to confirm the operability of the Ethernet connection. The Ethernet connection may include a voice over Internet protocol connection or a voice and video over Internet protocol connection.

20 Claims, 5 Drawing Sheets

VOICE AND VIDEO OVER INTERNET PROTOCOL ENABLED SECURITY SYSTEM

FIELD OF THE INVENTION

The field of the invention relates to security systems and more particularly to methods of interconnecting security systems.

BACKGROUND OF THE INVENTION

Security systems are generally known. Such systems typically consist of some form of intrusion detection of a secured area coupled with an alarm panel. Where the secured area is a building, the intrusion detectors may simply be door or window switches.

In more sophisticated systems, intrusion detection may be provided in the form of motion sensors. Motion sensors can be infrared or ultrasonic.

In addition to motion detectors, many homes are also protected through the use of glass breakage detectors. In this case, the glass breakage detectors are especially constructed to respond to the specific frequencies associated with breaking glass.

In each case, the intrusion detectors are connected to an alarm panel. The alarm panel, in turn, may be provided with an audible alarm to alert authorized occupants to the presence of intruders.

The alarm panel may, in turn, be connected to a remotely located monitoring station. The monitoring station has the additional advantage of being able to summon police even when the normal occupants of a secured area are not present.

While existing security systems are effective, they are expensive to install and can be unreliable. While a sensor can report the type of intrusion, the sensor cannot provide a context of activation of the sensor or the type of threat involved. Because of the importance of security systems, a need exists for more reliable systems that are more flexible in operation.

DETAILED DESCRIPTION OF AN ILLUSTRATED EMBODIMENT

Figure 1:
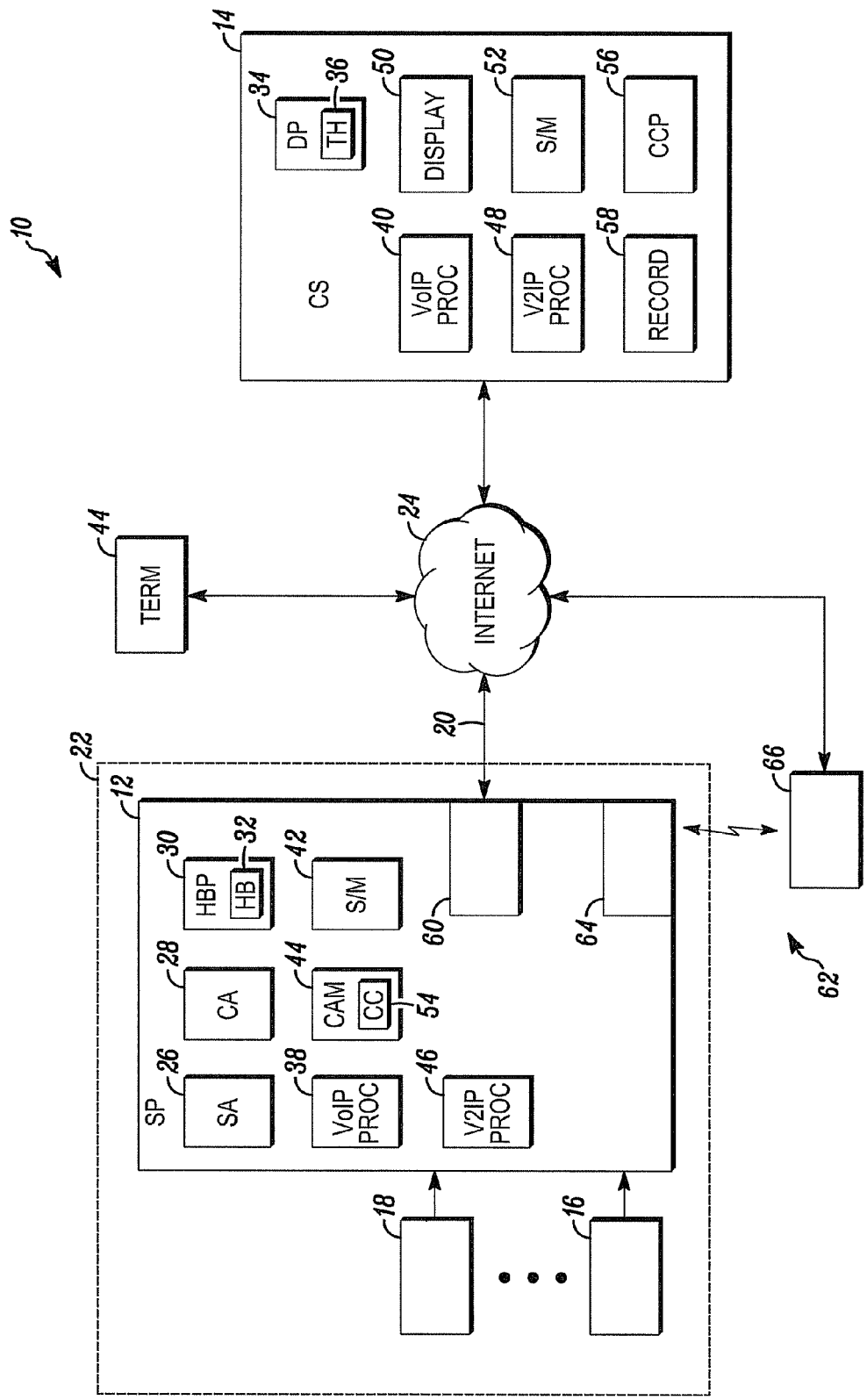
FIG. 1 is a block diagram of a security system in accordance with an illustrated embodiment of the invention.

FIG. 1 is a block diagram of a security system 10 of a residence shown generally in accordance with an illustrated embodiment of the invention. Included within the security system 10 is a security panel 12 and a central station monitoring system 14. The security panel 12 may be located within a secured area 22 and include a number of sensors 16, 18 that detect breaches of the secured area 22.

The security panel 12 is connected to the central monitoring station 14 via a network interface card 60 and an Ethernet connection 20 either directly or through the Internet 24. The security panel 12 may also be connected to the monitoring station 14 using a wireless interface such as an Ethernet bridge 62 including a network interface card 64 and Internet interface 66. It should be noted in this regard that conventional panels are not connected to central stations in real time because they are typically connected through a public switch telephone network (PSTN) which is not in real time because of the delay associated with dialing, establishing a telephone connection and transmitting data through the telephone connection.

The panel 12 may be voice and video over Internet protocol (V2IP) enabled with built-in Ethernet connectivity in the panel 12 or in accessories of the panel 12. Here alarm information can be transmitted in the form of voice (full duplex, live listen-in or pre-recorded messages), data (alerts) or video (full-duplex or live feed). The V2IP network can be a third party network or proprietary network of alarm monitoring service providers. Since the solution is based on IP, it is more cost effective compared to PSTN based alert monitoring systems. It also facilitates more frequent data exchanges between the central monitoring station 14 and panel 12. In addition, the system 10 provides a means for the panel to send periodic status information to the central station 14. Since the panel 12 or panel accessories of the panel 12 have an IP based connectivity, it can also be based upon IEEE 802.11a/b/g thereby providing for more flexible physical placement of the panel 12. With additional provision of voice and video over IP, it becomes possible for both sides to initiate voice or video calls with user configured auto-accept features for live listen-in and view-in facilities of the compromised premises. If required, it becomes also possible to set up a voice or video based conference call with any other mobile or telephone device. In addition, the central station 14 can also provide a facility for voice/video recording for further investigation.

Within the security panel 12 may be one or more security applications 26 that monitor the sensors 16, 18. Upon detecting activation of a sensor 16, 18, the security application 26 may transfer an identifier of the sensor 16, 18, a time and an address of the panel 12 or secured area 22 to a communication processor 28. Within the communication processor 28, the information may be incorporated into an intrusion alarm packet (message) that, in turn, is forwarded to the central station 14. In response, the central station 14 may begin contacting agents of the owner from a call list or, simply, call the police.

Figure 2:
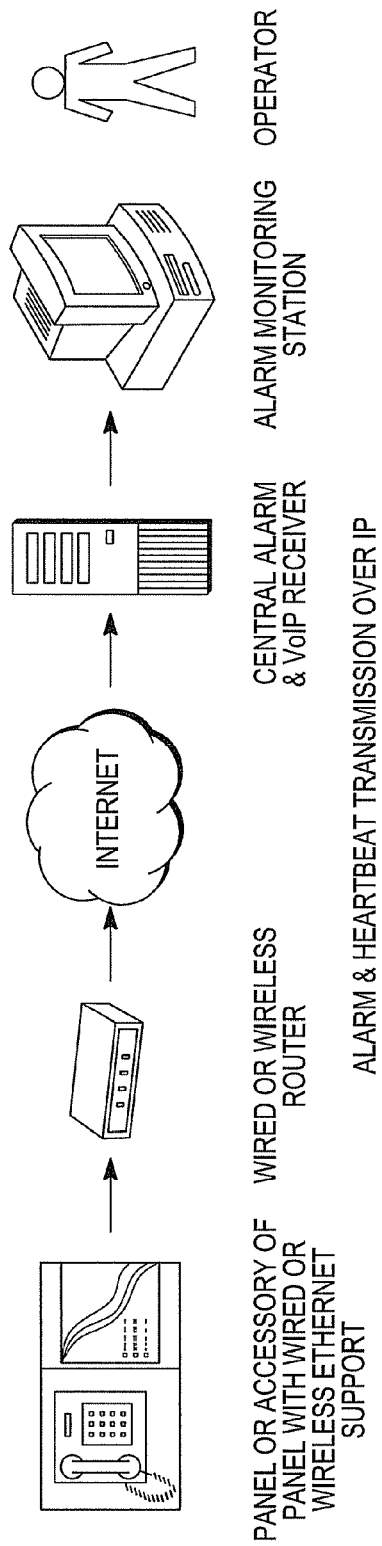
FIG. 2 is a block diagram of the security system of FIG. 1 exchanging a heartbeat message between the security panel and central monitoring station.

In addition to sending alarm messages, the security panel 12 may also include a heartbeat processor 30 (as shown in FIGS. 1 and 2) that periodically (e.g., 10 secs, 30 secs, etc.) sends a heartbeat packet (message) 32 to the central station 14. Included within the heartbeat message 32 may be a time of transmission and an identifier of the security panel 12 or secured area 22.

Included within the central station 14 may be a corresponding detection processor 34 that detects the heartbeat messages 32 and decodes each message 32 to recover an identifier of each panel 12. In addition to decoding each message 32, the detection processor 34 may also determine an elapsed time since receipt of the last message 32. If the elapsed time since receipt of the last message 32 exceeds a threshold value 35, then the central station may generate a panel failure alarm.

Figure 3:
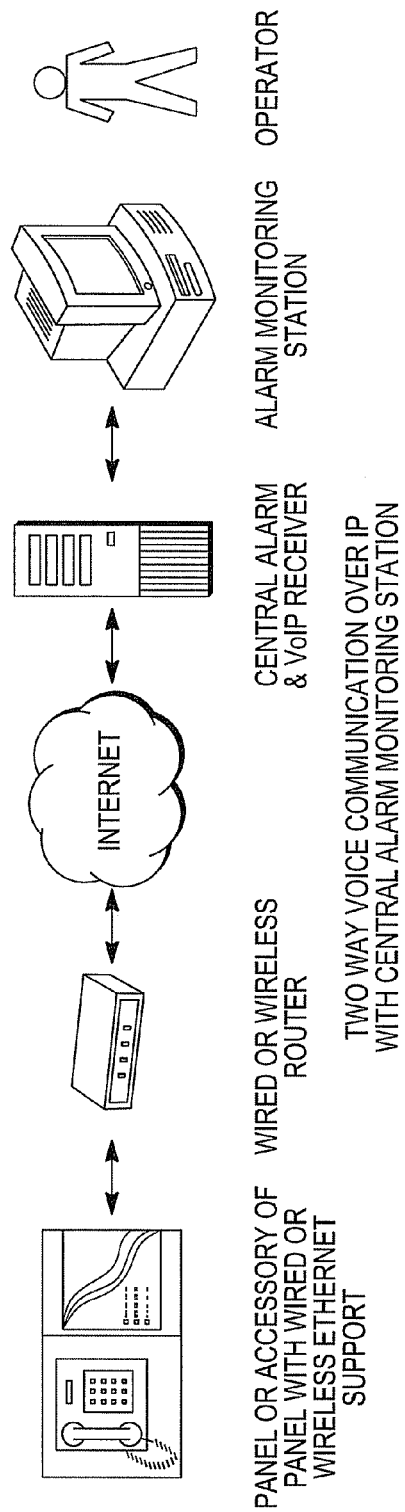
FIG. 3 is a block diagram of the security system of FIG. 1 exchanging voice using VOIP between the security panel and central monitoring station.

Upon detection of an intrusion or panel failure alarm message, the central station 14 may take any of a number of steps (as shown in FIGS. 1 and 3) towards diagnosing the source of the alarm. As a first step, the central station 14 may activate a VOIP processor 40. The VOIP processor 40 within the central station 14 may place an outgoing VOIP call to a corresponding VOIP processor 38 within the security panel 12. The VOIP processor 38 within the security panel 12 may automatically answer the call and establish a voice path between a speaker/microphone 42 of the security panel 12 and corresponding speaker/microphone 52 of the central station 14 all without any human intervention. Alternatively, the VOIP processor 38 within the security panel 12 may place an outgoing call to the VOIP processor 40 of the central station 14 for the same effect.

By establishing a voice connection between the security panel 12 and central station 14, a person at the central station 14 can monitor the vicinity of the security panel for any audible signs of intrusion or distress. For example, the person at the central station 14 could detect the sounds of a struggle between an occupant of the secured area 22 and an intruder and could summon help. Alternatively, if the occupant of the secured area 22 were having a medical emergency (e.g., a heart attack), then the person at the central station 14 may still be able to hear the occupant's cries for help through the microphone 42 and be able to summon help.

Figure 4:
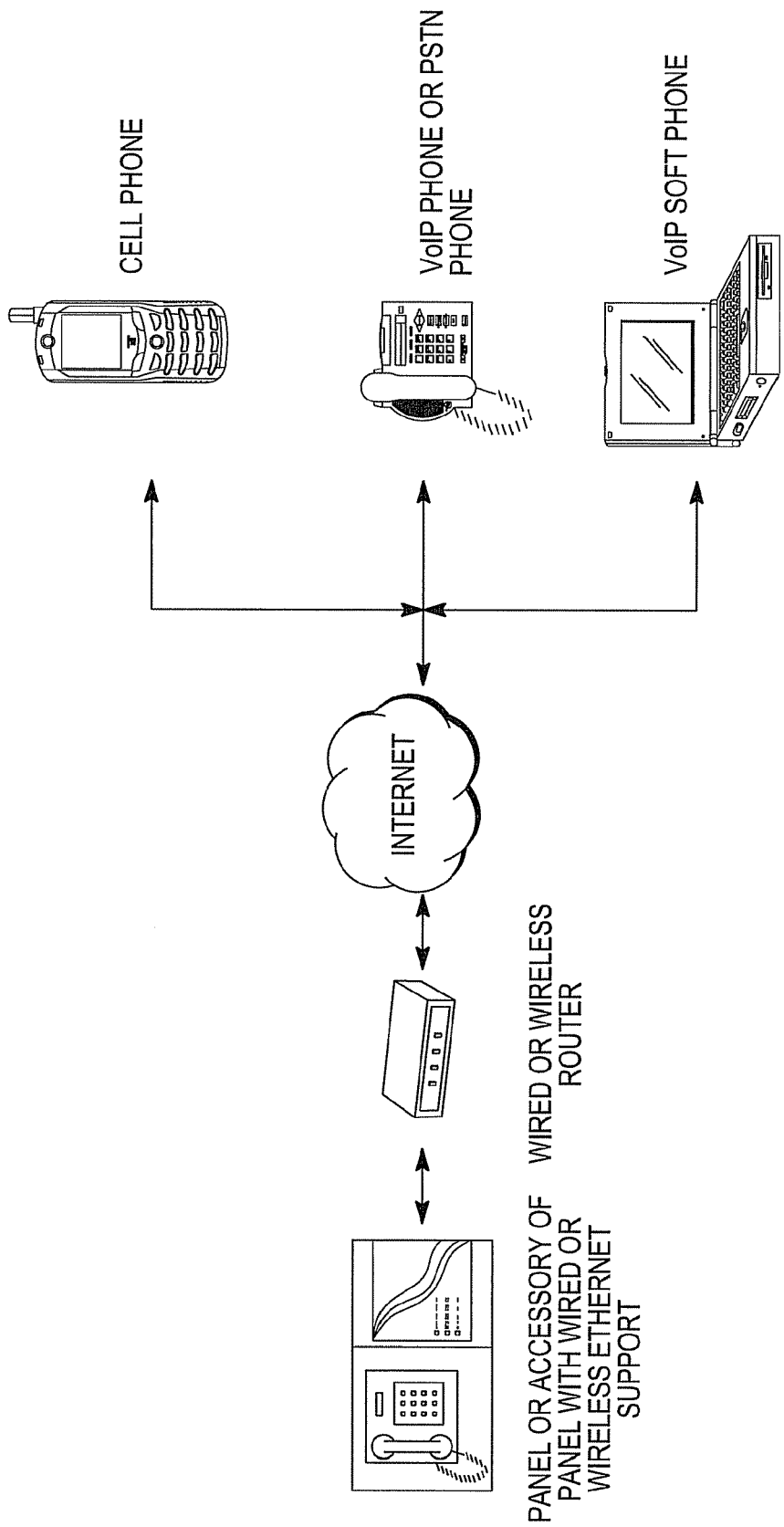
FIG. 4 is a block diagram of the security system of FIG. 1 exchanging voice among a multi-point connection using VOIP between the security panel and central monitoring station.

As a further alternative, the VOIP processor 38 within the security panel 12 may be programmed to automatically set up a multi-point audible connection (as shown in FIGS. 1 and 4) between the speaker/microphone 42 of the security panel 12, the VOIP processor 40 (and speaker/microphone 52 of the VOIP processor 40) and a designated third party terminal 44 (e.g., owner of the secured area, police, fire department, ambulance service, doctor, etc.). (It should be noted that, as used herein, the terminal 44 can be a computer, VOIP/V2IP enabled phone or VOIP/V2IP enabled handheld device.) As a still further alternative, the VOIP processor 38 within the security panel 12 may be programmed to automatically set up an audible connection between the speaker/microphone 42 of the security panel 12 and an owner of the secured area through a VOIP connection with the terminal 44 without involving the central station 14.

As another alternative, the VOIP processor 38 also allows an owner or other designated personnel to make a point-to-point VOIP call from any computer 44. In this case, the call into the panel 12 from the terminal 44 would be automatically accepted by the VOIP processor 38 allowing the owner to silently monitor the vicinity of the panel 12 through the microphone 42 without otherwise being detected. It should be noted in this regard that prior art security panels only allow outgoing calls but not calls in for purposes of monitoring.

Figure 5:
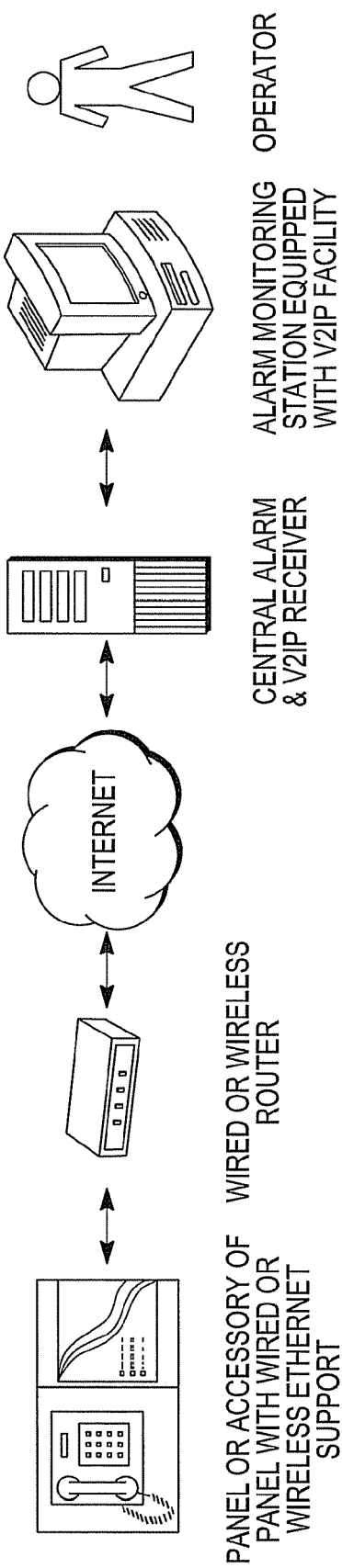
FIG. 5 is a block diagram of the security system of FIG. 1 exchanging voice and video using V2IP between the security panel and central monitoring station.

In still other situations, the panel 12 may be provided with a voice and video over IP (V2IP) processor 46 and a camera 44 as shown in FIGS. 1 and 5. The central station may also have a V2IP processor 48. In this case, upon the occurrence of an alarm, the security panel 12 may forward an alarm to the central station 14 and the central station 14 may automatically activate the camera 44 and speaker/microphone 42 of the security panel 12 to establish a voice and video session through the Ethernet connection 20 without any help from any person within the secured area 22.

An attending person at the central station 14 may directly view video from the camera 44 on a display 50 and listen to any audio from the microphone 42 through a speaker 52. If the attendant at the central station should decide that the video on the display 50 does not show any reason for the alarm, then the attendant may activate a camera control processor 56 that sends commands to a set of camera motors 54 that cause the camera 44 to zoom in and/or to tilt and pan in such a way as to allow the attendant to be able to observe any activity anywhere within the vicinity of the security panel or to track the object causing the disturbance. In this case, the camera 44 and speaker/microphone 42 (and corresponding speaker/microphone 52 and display 50 of the central station 14) allow the attendant of the central station to observe any situation requiring the assistance of the police or discuss any situation requiring help with a resident of the secured area 22. This can be very helpful in identifying false alarms or if an intruder is present or if someone needs medical assistance.

A recorder 58 may also be provided within the central station 14 to record any voice and/or video collected from this secure area 12. This can be very important for any forensic study performed later to determine what happened within the secure area 22 during or after the detection of the alarm.

In a similar way, once an alarm is detected by the security panel 12, the panel 12 could simply send a request for a voice and video conference with the central station 14. This could be done separately or in conjunction with the transmission of an alarm to the central station 14.

Figure 6:
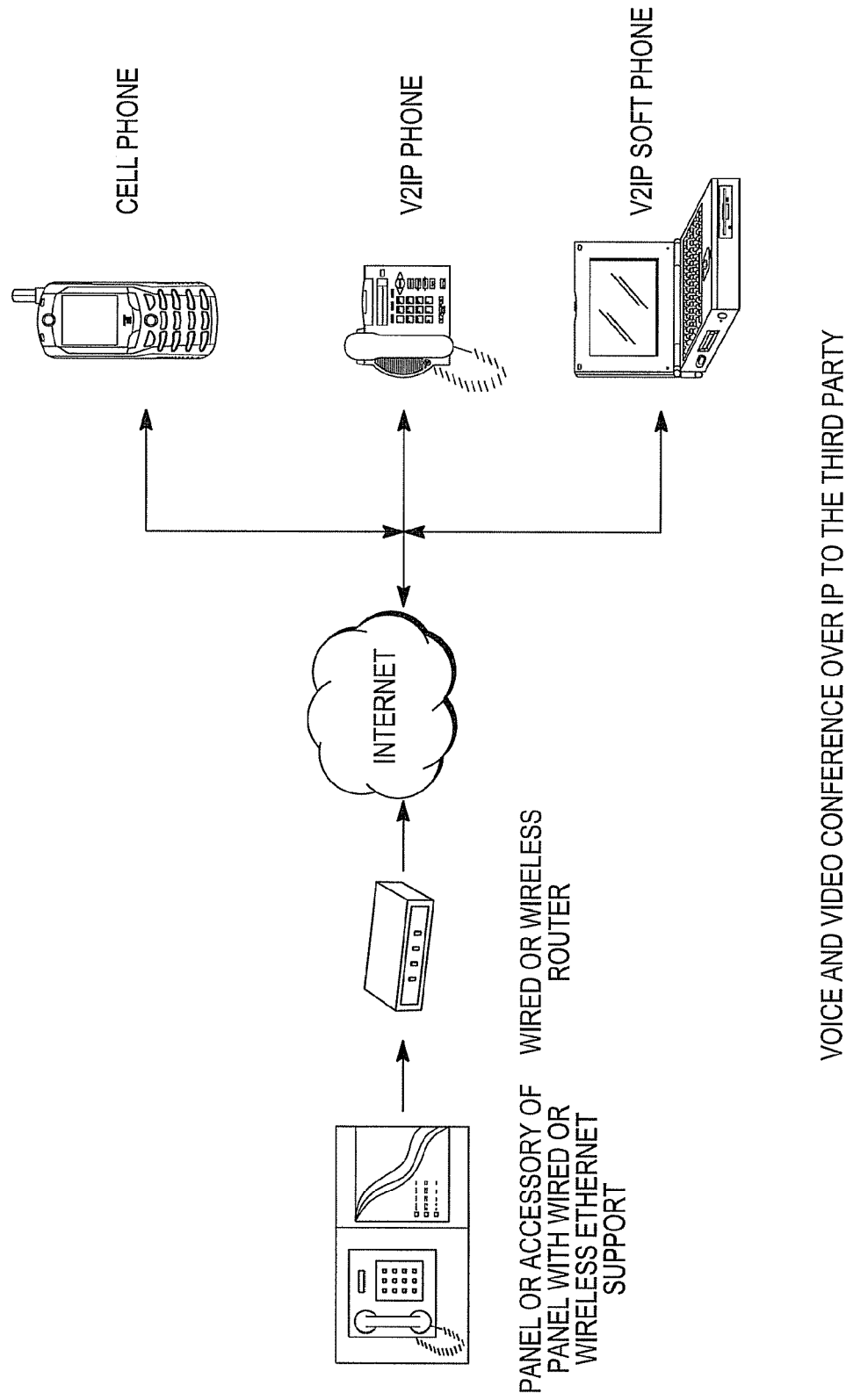
FIG. 6 is a block diagram of the security system of FIG. 1 exchanging voice and video among a multi-point connection using V2IP between the security panel and central monitoring station.

In addition, the V2IP processor 46 may also operate to set up a multi-point video conference (as shown in FIGS. 1 and 6) in the event of an alarm between the security panel 12, the central monitoring station 14 and a third party (e.g., owner, police, fire department, ambulance service, physician, etc.) 44. The V2IP processor 46 may also set up a point-to-point audio and video conference with a third party without involving the central station 14.

An owner of the secured area may also use the terminal 44 to set up a point-to-point audio and video conference with the panel 12 where the conference is automatically accepted by the panel 12. This may be very important for purposes of monitoring the activities of children, pets or even the elderly.

A specific embodiment of method and apparatus for providing a security system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of operating a security system comprising:
   providing a security panel coupled to a plurality of security sensors;
   a central monitoring station monitoring the security panel;
   coupling the security panel to the central monitoring station via a public computer network through a first interface, and, an Ethernet connection or through a separate, wireless, interface;
   periodically generating a heartbeat within the security panel that is periodically sent to the central monitoring station to confirm the operability of the Ethernet connection and, enabling a person, displaced from the central monitoring station, to make a voice over Internet protocol point-to-point call to the security panel, via the computer network, to enable that person to silently monitor a vicinity of the security panel without otherwise being detected.

2. The method of operating the security system of claim 1 further comprising measuring a time period between heartbeats at the central monitoring station and generating an alarm when the measured time period exceeds a threshold time value.

3. The method of operating the security system of claim 1 wherein the Ethernet connection further comprises a voice over Internet protocol connection.

4. The method of operating the security system of claim 3 further comprising the central monitoring station setting up a voice connection between the central monitoring station and security panel upon detection of an alarm where the voice connection is automatically accepted by the security panel.

5. The method of operating the security system of claim 4 further comprising an operator located at the central monitoring station passively listening to any sounds from a vicinity of the security panel through the voice connection.

6. The method of operating the security system of claim 3 further comprising the security panel automatically setting up a multi-point voice connection between the security panel, the central monitoring station and a third party terminal.

7. The method of operating the security system of claim 3 further comprising the security panel automatically setting up a voice connection between the security panel and a third party.

8. A security system comprising:
a security panel coupled to a plurality of security sensors;
a central monitoring station monitoring the security panel;
a first interface coupling the security panel to the central monitoring station through an Ethernet connection;
a separate, wireless, interface coupling the security panel to the central monitoring station;
a processor that periodically generates a heartbeat within the security panel that is periodically sent to the central monitoring station to confirm the operability of the Ethernet connection and,
a terminal displaced from the central monitoring station, to make a voice over Internet protocol point-to-point call to the security panel, via the computer network, to enable that terminal to silently monitor a vicinity of the security panel without otherwise being detected.

9. The security system of claim 8 further comprising means for measuring a time period between heartbeats at the central monitoring station and generating an alarm when the measured time period exceeds a threshold time value.

10. The security system of claim 8 wherein the Ethernet connection further comprises a voice over Internet protocol connection.

11. The security system of claim 10 further comprising a voice connection set up by the central monitoring station between the central monitoring station and security panel upon detection of an alarm where the voice connection is automatically accepted by a processor within the security panel.

12. The security system of claim 10 further comprising a multi-point voice connection automatically set up between the security panel, the central monitoring station and a third party upon detection of an alarm.

13. The security system of claim 10 further comprising a voice connection automatically set up between the security panel and a third party upon detection of an alarm.

14. The security system of claim 8 wherein the Ethernet connection further comprises a video, voice over Internet protocol connection.

15. The security system of claim 14 further comprising a voice and video connection established between the central monitoring station and security panel upon detection of an alarm where the voice and video connection is automatically accepted by the security panel.

16. The security system of claim 14 further comprising a multi-point voice and video connection automatically set up between the security panel, the central monitoring station and a third party upon detection of an alarm.

17. A security system comprising:
a security panel coupled to a plurality of security sensors;
a central monitoring station monitoring the security panel;
an Internet connection between the security panel and the central monitoring station wherein the security panel includes first and second separate Internet interfaces, at least one of which is a wireless interface; and
an audio connection automatically established between the security panel and central monitoring station upon the detection of an alarm by the security panel to silently monitor a vicinity of the security panel without otherwise being detected.

18. The security system of claim 17 which includes an Ethernet connection which comprises a video, voice over Internet protocol connection.

19. The security system of claim 18 further comprising a voice and video connection established between the central monitoring station and security panel upon detection of an alarm where the voice and video connection is automatically accepted by the security panel.

20. The security system of claim 18 further comprising a multi-point voice and video connection automatically set up between the security panel, the central monitoring station and a third party upon detection of an alarm.

\* \* \* \* \*